(Model.)

D. BERRY.
SULKY.

No. 280,561. Patented July 3, 1883.

WITNESSES:
Otto Beyer
C. Sedgwick

INVENTOR:
D. Berry
BY Munn & Co.
ATTORNEYS.

United States Patent Office.

DAVID BERRY, OF GUALALA, CALIFORNIA.

SULKY.

SPECIFICATION forming part of Letters Patent No. 280,561, dated July 3, 1883.

Application filed November 25, 1882. (Model.)

*To all whom it may concern:*

Be it known that I, DAVID BERRY, of Gualala, in the county of Mendocino and State of California, have invented certain new and useful Improvements in Trotting-Vehicles, of which the following is a full, clear, and exact description.

My invention relates to improvements in that class of vehicles in which a single wheel is used; and it consists in the peculiar construction and arrangement of parts, as hereinafter fully described, and pointed out in the claims.

Reference is to be had to the accompanying drawings, forming part of this specification, in which similar letters of reference indicate corresponding parts in both the figures.

Figure 1:
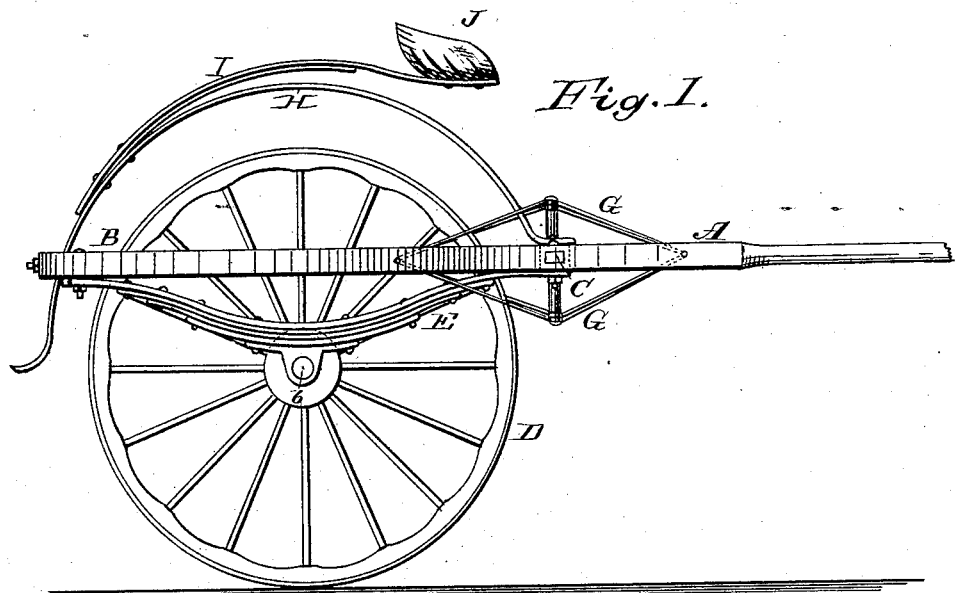
Figure 2:
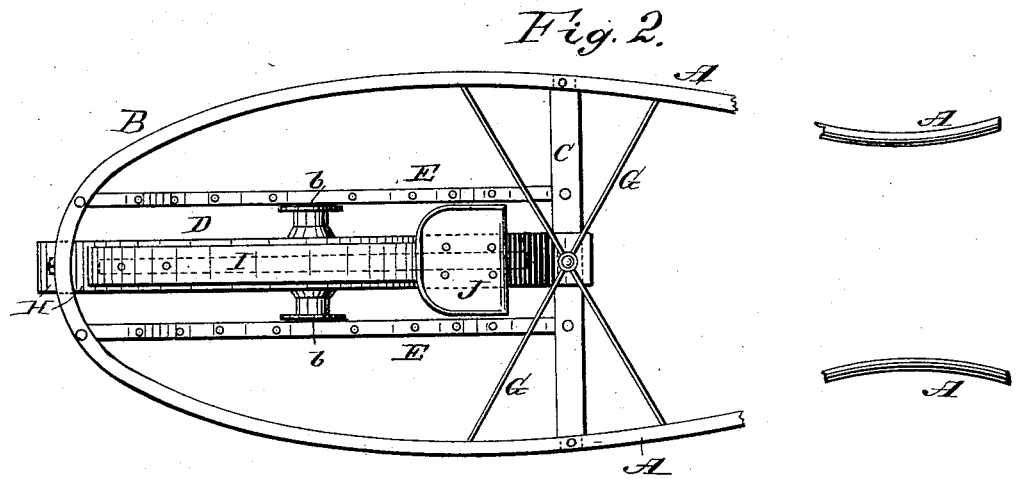

Figure 1 is a side elevation of my improved one-wheel vehicle, the shafts being represented as partly broken away, and Fig. 2 a partly broken plan of the same.

A A are the shafts, which are made to form a continuous construction with the outer frame, B, that extends in a curvilinear direction around the back end of the vehicle.

C is a cross-bar uniting the front portion of said frame or rear ends of the shafts.

D is the single running-wheel, arranged to occupy a longitudinal central position relatively to the outer frame and shafts and within said frame; and E E are springs arranged on either side of the wheel, and having boxes for supporting the trunnions $b$ of the wheel, said springs, which carry the whole heft, being secured at their opposite ends to the back portion of the frame B and to the cross-bar C.

G G are raised cross-braces arranged to connect the shafts A A with the frame B and its cross-bar C in front of the wheel, and serving as a truss to prevent the shafts from working or twisting, and thereby holding them solid, so that one of the shafts cannot rise and the other lower independently of the frame B. A similar truss or combination of braces may be arranged on the under side of the shafts, outer frame, and cross-bar C, as a further security against the shafts working or twisting.

H is a band or guard arranged over the wheel and uniting the cross-bar C with the rear end of the outer frame. This band, which serves to protect the rider from dust or mud, also carries a single or many-leaved spring, I, attached at its back end to said band or guard and having on its front end the rider's seat J.

By the braced construction of the shafts, and by using suitable harness, so that the shafts cannot work separately up or down, the wheel D will be kept straight with the horse and the vehicle be prevented from turning over so long as the horse remains on its feet. The vehicle, too, will be easier on the horse than a two-wheeled vehicle or four-wheeled one, as it will be free from that side jerk which ensues from the wheel or wheels on the one side of a many-wheeled vehicle striking an obstruction or dropping into a rut or low or uneven place in the road. My improved vehicle also can be built at much less expense, as there is no long axle or body and only one wheel, and by keeping straight and perpendicular it will be easier on the rider, with less tendency to upset. It will run, too, on any path or trail upon which a man on horseback can travel. Neither need the horse be kept in the middle of the road, as in other one-horse vehicles. Furthermore, the connection of the rider's seat by a spring with the band or guard over the wheel forms a very simple and efficient mode of carrying the seat.

Having thus fully described my invention, what I claim as new, and desire to secure by Letters Patent, is—

1. In a vehicle, the combination, with the shafts A, the frame B, and the cross-bar C, of the springs E, attached to said cross-bar and frame and provided with boxes, and the wheel D, substantially as herein shown and described.

2. In a vehicle, the combination, with the shafts A, the frame B, and the cross-bar C, of the cross-braces G, secured to the center of the said cross-bar, and having their ends attached to the frame and shafts, substantially as herein shown and described.

3. In a vehicle, the combination, with the frame B, the cross-bar C, and the wheel D, of the guard H, attached to the said cross-bar and frame, and the spring I, secured to the said guard and having the seat J secured to its free end, substantially as herein shown and described.

DAVID BERRY.

Witnesses:
PATRICK W. HAMILL,
FRANK SCOFIELD.